(12) United States Patent
Wakasa (10) Patent No.: US 9,892,347 B2
(45) Date of Patent: Feb. 13, 2018

(54) PRINTER AND CONTROL METHOD OF A PRINTER

(71) Applicant: Seiko Epson Corporation, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/157,001

(22) Filed: May 17, 2016

(65) Prior Publication Data

US 2016/0358051 A1    Dec. 8, 2016

(30) Foreign Application Priority Data

Jun. 8, 2015 (JP) ................................. 2015-115549

(51) Int. Cl.
*G06F 13/00* (2006.01)
*G06F 3/12* (2006.01)
*G06K 15/02* (2006.01)
*G06K 15/00* (2006.01)

(52) U.S. Cl.
CPC ..... *G06K 15/4045* (2013.01); *G06K 15/1817* (2013.01); *G06F 3/1203* (2013.01); *G06F 13/00* (2013.01)

(58) Field of Classification Search
None
See application file for complete search history.

(56) References Cited

U.S. PATENT DOCUMENTS

| | | | | |
|---|---|---|---|---|
| 5,878,197 | A | * | 3/1999 | Miyahara ............. G06F 3/1293 358/1.15 |
| 6,456,390 | B1 | * | 9/2002 | Okubo .................... G06K 15/02 358/1.17 |
| 6,563,597 | B1 | * | 5/2003 | Dohi ...................... G06F 3/1293 358/1.13 |
| 6,604,151 | B1 | * | 8/2003 | Date ........................ G06F 13/38 710/14 |
| 7,586,638 | B2 | | 9/2009 | Hyogo et al. |
| 2001/0024585 | A1 | * | 9/2001 | Koakutsu ............. B41J 2/17506 400/76 |
| 2002/0001104 | A1 | * | 1/2002 | Shima .................... G06K 15/00 358/442 |
| 2006/0238804 | A1 | * | 10/2006 | Hyogo .................. G06F 3/1204 358/1.15 |
| 2008/0204776 | A1 | * | 8/2008 | Wakasa ................ G06K 15/028 358/1.9 |

FOREIGN PATENT DOCUMENTS

| | | |
|---|---|---|
| JP | 09-314960 A | 12/1997 |
| JP | 2006-309343 A | 11/2006 |
| JP | 2011-235568 A | 11/2011 |

* cited by examiner

*Primary Examiner* — Beniyam Menberu
(74) *Attorney, Agent, or Firm* — Nutter McClennen & Fish LLP; John J. Penny, Jr.; Alex Nagorniy (57) ABSTRACT

Whether received data is the header of a print image command is determined in a receive interrupt process. If the received data is the header of a print image command, data transmission is paused. Whether the received data is a header of a print image command that can be transferred by DMA is then determined in a command task. If the received data is a header of a print image command that can be transferred by DMA, a DMA transfer mode is entered and the data transmission pause is cancelled, and the received data is transferred in the DMA transfer mode to a print buffer 42 by DMA.

10 Claims, 4 Drawing Sheets

PRINTER AND CONTROL METHOD OF A PRINTER

Priority is claimed under 35 U.S.C. §119 to Japanese Application nos. 2015-115549 filed on Jun. 8, 2015, which is hereby incorporated by reference in their entirety.

BACKGROUND

1. Technical Field

The present disclosure relates to a printer and a control method of a printer that receives data from a host device and prints images.

2. Related Art

A printer according to the related art is described in JP-A-2006-309343. This printer has a host interface for receiving print commands and other data sent from a host device; a receive buffer for temporarily storing data received by the host interface; a command interpreter that interprets print commands stored in the receive buffer and generates print data; a print buffer for buffering print data; a print engine that prints based on the print data stored in the print buffer; and a DMA controller for transferring data from the receive buffer to the print buffer by DMA (Direct Memory Access).

This printer is configured to temporarily store received data to the receive buffer and if the stored data is a print image command (image printing command) that can be passed in a DMA transfer mode, transfers the data in a DMA transfer mode. More specifically, if the received data is a print image command that can be transferred by DMA, a DMA controller passes the print image command from the receive buffer to the print buffer by DMA. As a result, data transfer is faster and printer throughput can be increased.

While this printer temporarily stores received data to the receive buffer and then transfers the received data from the receive buffer to the print buffer in a DMA transfer mode if the stored data is a print image command that can be transferred in a DMA transfer mode, it is also conceivable to transfer the received data directly to the print buffer without first storing the data in the receive buffer. For example, an evaluation unit that sequentially stores received data to a receive buffer and determines if the stored data is the header of a print image command that can be passed by DMA may be provided. Depending on the decision of the evaluation unit, the data transfer mode may be switched in this configuration from the normal transfer mode to the DMA transfer mode when the header of a print image command is detected. The data payload of the print image command following the header can then be passed directly by DMA in the DMA transfer mode to the print buffer without first storing the data to the receive buffer. This configuration can accelerate data transfer.

Even with this configuration, however, all data in the print image command cannot be transferred in the DMA transfer mode. More specifically, there is a time lag between reception of the header of a print image command that can be passed in the DMA transfer mode, and detection of the header by the evaluation unit. Part of the data payload of the print image command following the header is therefore stored to the receive buffer during this time lag, and the buffered data must be processed in the normal transfer mode. As a result, because part of the data payload of the print image command cannot be processed in the DMA transfer mode, the entire data payload cannot be transferred in the DMA transfer mode. Data transfer is therefore slower.

SUMMARY

A printer and a control method of a printer according to the disclosure enable accelerating data transfer.

A printer according to the disclosure includes: a data storage unit configured to store data received from a host device in a receive buffer in a receive interrupt process; an interrupt evaluation unit configured to determine if the data stored in the receive buffer in the receive interrupt process is a header of a print image command; a data transmission-stop unit configured to pause data transmission by the host device if the header of a print image command is detected in the receive interrupt process; a command interpreter configured to determine in a command task if the data stored in the receive buffer is a header of a print image command that can be transferred by DMA; a mode selector configured to change the data transfer mode from a normal transfer mode to a DMA transfer mode if the command interpreter determines the data is a header of a print image command that can be transferred by DMA; a cancel transmission-stop unit cancels the pause of data transmission by the host device if the command interpreter determines the data is a header of a print image command that can be transferred by DMA; a DMA transfer unit configured to transfer data received from the host device by DMA to a print buffer without storing the received data to the receive buffer when the mode selector has changed the data transfer mode from the normal transfer mode to a DMA transfer mode; and a print unit configured to read the data transferred to the print buffer and print.

Preferably in another aspect of the disclosure, the mode selector holds the normal transfer mode as the data transfer mode when the command interpreter determines the data is not a header of a print image command that can be transferred by DMA; and the cancel transmission-stop unit cancels the pause of data transmission by the host device when the command interpreter determines the data is not a header of a print image command that can be transferred by DMA.

Another aspect of the disclosure is a control method of a printer, including: a data storage step of storing data received from a host device in a receive buffer in a receive interrupt process; an interrupt evaluation step of determining if the data stored in the receive buffer in the receive interrupt process is a header of a print image command; a transmission-stop step of pausing data transmission by the host device if the header of a print image command is detected in the receive interrupt process; an evaluation step of determining in a command task if the data stored in the receive buffer is a header of a print image command that can be transferred by DMA; a mode selecting step of changing the data transfer mode from a normal transfer mode to a DMA transfer mode if the evaluation step determines the data is a header of a print image command that can be transferred by DMA; a cancel transmission-stop step of cancelling the pause of data transfer by the host device if the evaluation step determines the data is a header of a print image command that can be transferred by DMA; a DMA transfer step of transferring data received from the host device by DMA to a print buffer without storing the received data to the receive buffer when the mode selecting step has changed the data transfer mode from the normal transfer mode to a DMA transfer mode; and a print step of reading the data transferred to the print buffer and printing.

Thus comprised, as soon as received data is determined in the receive interrupt process to be the header of a print image command, data transfers by the host device are paused and this data transfer pause is cancelled after evaluation by the command interpreter (evaluation step). As a result, data transmission by the host device can be stopped during the time lag described above. As a result, data in the data payload following the header will not be stored to the receive buffer during this time lag. Needing to transfer some of the data in the data payload of a print image command that can be transferred by DMA in a normal transfer mode can therefore be prevented. More specifically, the entire data payload of the print image command can be transferred in DMA transfer mode. High speed data transfer is therefore possible.

A printer according to another aspect of the disclosure preferably also has an evaluation blocking unit configured to block evaluation by the interrupt evaluation unit until data transfer of the print image command ends when the interrupt evaluation unit determines the received data is a header of a print image command.

Once the received data is determined to be a header of a print image command, the data payload of the print image command following the header is received.

However, because evaluation by the interrupt evaluation unit is blocked until data transfer of the print image command is completed when the received data is the header of a print image command, evaluation by the interrupt evaluation unit during the receive interrupt process is omitted while the data payload of the print image command is received. The data payload of the print image command can therefore be transferred even more quickly.

Further preferably in a printer according to another aspect of the disclosure, the interrupt evaluation unit stores the data in a storage buffer when the received data is determined to be data that is part of a header of a print image command, and clears the storage buffer when the received data is determined to be data that is not part of a header of a print image command.

Thus comprised, when the received data is determined to be data that is part of the header of a print image command, the data is accumulated in a storage buffer, and once the received is confirmed in combination with the accumulated data to be the header of a print image command, the received data is determined to be the header of a print image command. If the received data is determined to not be data that is part of the header of a print image command, the next evaluation can be immediately executed using the storage buffer by clearing the storage buffer.

Other objects and attainments together with a fuller understanding of the disclosure will become apparent and appreciated by referring to the following description and claims taken in conjunction with the accompanying drawings.

DESCRIPTION OF EMBODIMENTS

Preferred embodiments of a printer and a control method of a printer according to the present disclosure are described below with reference to the accompanying figures. This embodiment of the disclosure describes a printing system using the printer and the control method of a printer according to the disclosure. This printing system applies a printing process to a recording medium, and produces a printout (such as a sales receipt).

Figure 1:
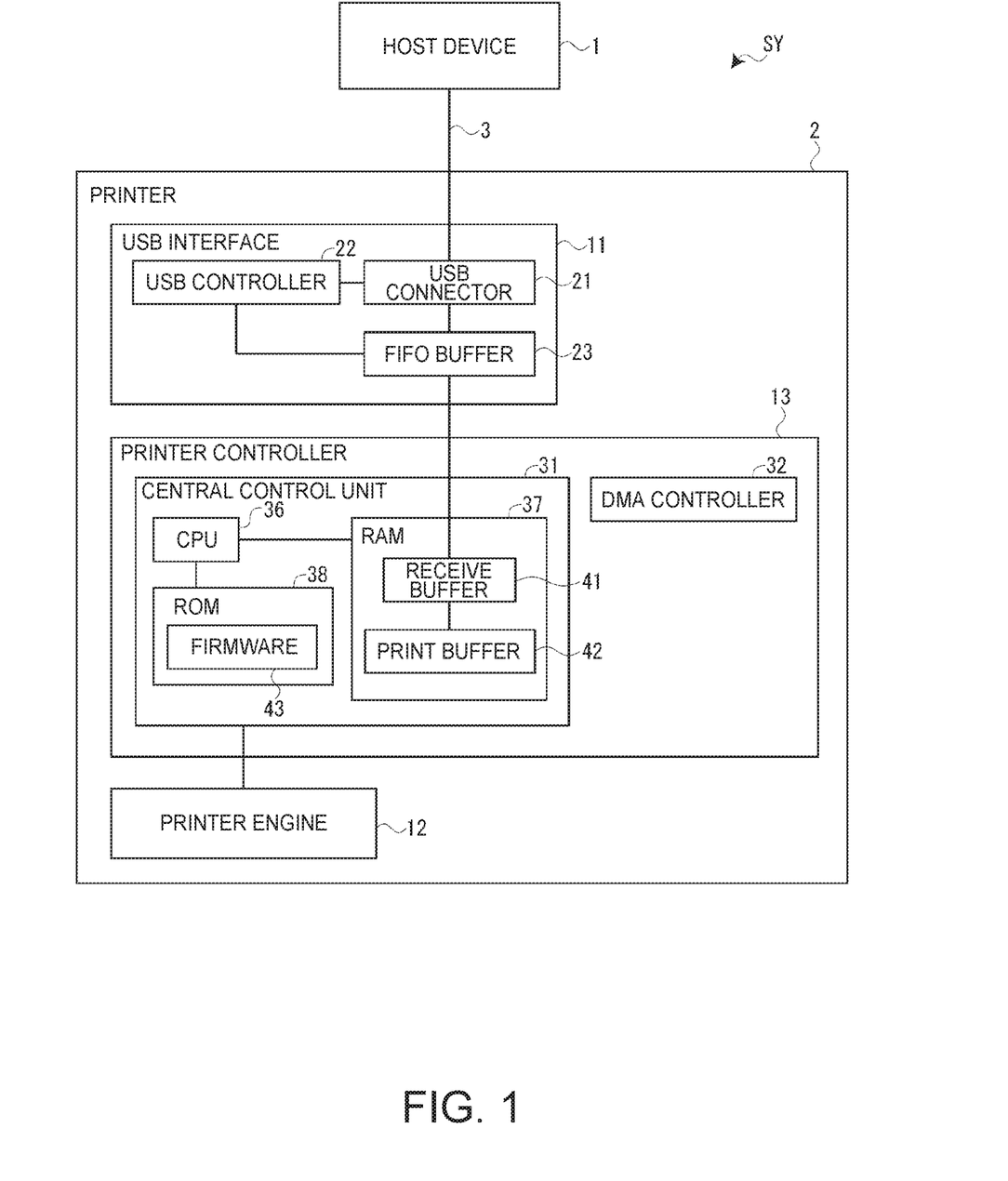
FIG. 1 is a block diagram showing the configuration of a printing system according to the disclosure.

As shown in FIG. 1, the printing system SY according to this embodiment includes a host device 1 and a printer 2 that connects to the host device 1. The host device 1 and printer 2 in this example are connected by a USB (Universal Serial Bus) cable 3, and are configured to communicate data therebetween by USB communication.

The host device 1 generates commands and sends the generated commands to the printer 2. More specifically, the host device 1 generates commands such as print image commands and print text commands, and sends the commands one byte at a time to the printer 2. The commands have a header and a data payload (containing the image data of a print image command, for example). The header includes at least information indicating the type of command, and information identifying the size of the data payload. As described further below, the printer 2 can acquire this information by reading the header.

The printer 2 receives the commands from the host device 1, and executes specific processes based on the received commands. For example, the printer 2 prints an image on a recording medium based on a print image command, and prints text on a recording medium based on a print text command. The printer 2 in this example is a receipt printer.

The printer 2 has a USB interface 11 (reception unit) configured to communicate with the host device 1; a printer engine 12 for printing on the print medium; and a printer controller 13 that controls the USB interface 11 and the printer engine 12. The printer 2 receives commands through the USB interface 11, and executes a printing process based on the received commands by the printer engine 12, as controlled by the printer controller 13. A printout is thus produced.

The USB interface 11 communicates with the host device 1 through the USB cable 3. The USB interface 11 includes a USB connector 21 for sending and receiving data; a USB controller 22 that controls sending and receiving data through the USB connector 21; and a FIFO (first in, first out) buffer 23 for temporarily storing data received through the USB connector 21. When data including the foregoing commands is received from the host device 1, the data transmitted in 1-byte units is stored sequentially to the FIFO buffer 23 as controlled by the USB controller 22. As described further below, this temporarily stored data is transferred by the printer controller 13 from the FIFO buffer 23 to the receive buffer 41 or print buffer 42 (both described below).

The printer controller 13 has a central control unit 31 configured to centrally control the printer 2, and a DMA controller 32 for handling DMA transfers. The DMA controller 32 is used to transfer data stored in the FIFO buffer 23 to the print buffer 42 in a DMA transfer mode described below.

The central control unit 31 includes a CPU (Central Processing Unit) 36, RAM (Random Access Memory) 37, and ROM (Read Only Memory) 38. The CPU 36 is a processor for executing various operations.

RAM 37 is used as working memory when the CPU 36 executes processes. RAM 37 includes a receive buffer 41 for temporarily storing data from the USB interface 11, and a print buffer 42 for storing image data to be printed by the printer engine 12.

ROM 38 stores control programs and control data used by the CPU 36 to execute operations. More specifically, ROM 38 stores firmware 43 as a control program for controlling the printer 2.

In this printer 2, the printer controller 13 functions as a transfer unit that transfers data received by the USB interface 11 (data stored in FIFO buffer 23) to the print buffer 42. More specifically, the printer controller 13 has two data transfer modes, a normal transfer mode and a DMA transfer mode, and switches appropriately between these transfer modes to transfer data. As described further below, data stored in the FIFO buffer 23 is stored in the receive buffer 41 by a receive interrupt process in the normal transfer mode. In the DMA transfer mode, data stored in the FIFO buffer 23 is not stored in the receive buffer 41, and instead is transferred directly to the print buffer 42 by DMA. The functional configuration of the printer controller 13 that achieves this operation is described next with reference to FIG. 2.

Figure 2:
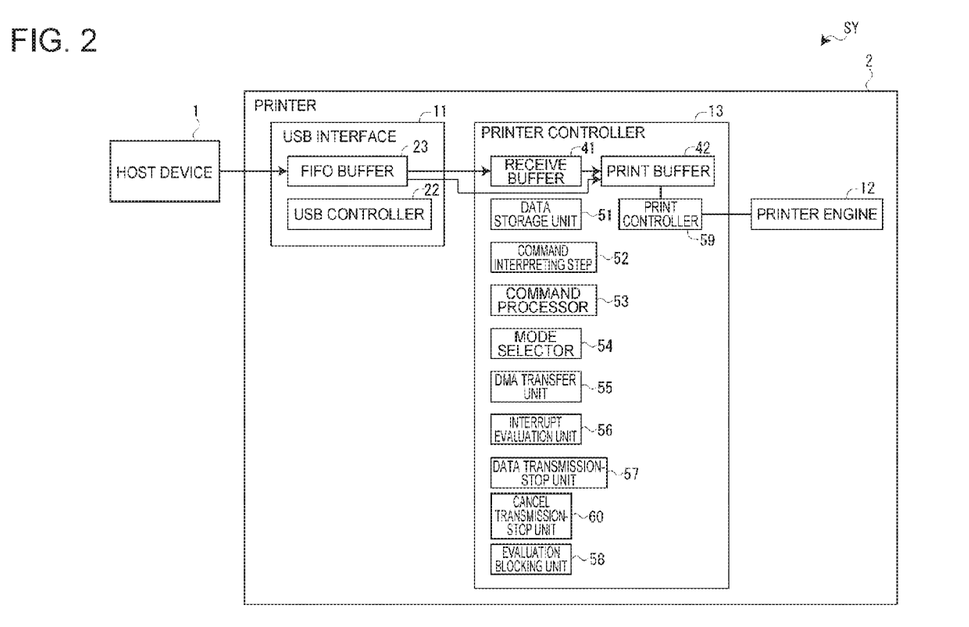
FIG. 2 is a function block showing the functional configuration of the printer controller.

As shown in FIG. 2, the printer controller 13 has a data storage unit 51, command interpreter 52, command processor 53, mode selector 54, DMA transfer unit 55, interrupt evaluation unit 56, data transmission-stop unit 57, cancel transmission-stop unit 60, evaluation blocking unit 58, print controller 59, and the above-described receive buffer 41 and print buffer 42. The data storage unit 51, command interpreter 52, command processor 53, mode selector 54, interrupt evaluation unit 56, data transmission-stop unit 57, cancel transmission-stop unit 60, evaluation blocking unit 58, and print controller 59 are embodied by the CPU 36 running firmware 43. The DMA transfer unit 55 is embodied by the DMA controller 32.

In the receive interrupt process, the data storage unit 51 stores data stored in the FIFO buffer 23 to the receive buffer 41. More specifically, the data storage unit 51 transfers data stored in the FIFO buffer 23 one byte at a time to the receive buffer 41.

In a command task, the command interpreter 52 interprets commands in the data stored in the receive buffer 41. More specifically, the command interpreter 52 sequentially examines the data stored in the receive buffer 41, extracts the header portion of any command, and determines the type of command and the size of the data packet based on the extracted header. The command interpreter 52 also determines if the extracted header is the header of a print image command that can be transferred by DMA. Conditions for determining if transfer by DMA is possible include that a communication device capable of high speed reception is connected; the standard block transfer mode is set (page mode can overwrite data); the rendering position on the X-axis (paper width direction) is a multiple of 8; the rendered image can fit in the remaining rendering space; and scaling on the X-axis or Y-axis (paper width and paper length directions) is not specified, for example.

Based on the result from the command interpreter 52, the command processor 53 executes a command process appropriate to the type of command. For example, if the type of command is determined to be a print text command, the command processor 53 generates image data for printing text and renders the generated image data in the print buffer 42. If the type of command is determined to be a print image command, the image data from the data packet is rendered in the print buffer 42 if the print image command cannot be transferred by DMA. If a print image command that can be transferred by DMA is detected, a DMA transfer command is output to the DMA transfer unit 55 to transfer the data by DMA.

The mode selector 54 switches the data transfer mode between the normal transfer mode and DMA transfer mode. More specifically, when the received data is determined by the command interpreter 52 to be the header portion of a print image command enabling DMA transfer, the mode selector 54 switches the data transfer mode from the normal transfer mode to the DMA transfer mode, and reports the same to the USB controller 22. Once data transfer (DMA transfer) of that print image command ends, the data transfer mode is reset (changed) from the DMA transfer mode to the normal transfer mode, and the mode selector 54 reports the same to the USB controller 22. When a report of a mode change is received, the USB controller 22 switches the destination of the endpoint of the FIFO buffer 23 between the receive buffer 41 and print buffer 42 appropriately.

When data transfer is set to the DMA transfer mode, the DMA transfer unit 55 receives a DMA transfer command from the command processor 53 and transfers data stored in the FIFO buffer 23 by DMA transfer. More specifically, the data stored in the FIFO buffer 23 is not stored in the receive buffer 41, and instead is transferred directly to the print buffer 42. Note that this embodiment of the disclosure is configured to output a DMA transfer command if the received data is determined to be the header of a print image command that can be transferred by DMA. As a result, the DMA transfer unit 55 serves to transfer the data payload following the header by DMA.

In the receive interrupt process, the interrupt evaluation unit 56 determines if the received data is the header of a print image command. More specifically, the interrupt evaluation unit 56 examines the data as it is received in 1-byte units, and if the set of received data is the header of a print image command, determines the received data is the header of a print image command.

If in the receive interrupt process the interrupt evaluation unit 56 determines the received data is the header of a print image command, the data transmission-stop unit 57 sends a BUSY output signal to the host device 1 at that time to pause data transmission by the host device 1. When the process of the command interpreter 52 determining in the command task if DMA transfer is possible ends, the cancel transmission-stop unit 60 sends a BUSY cancel signal to the host device 1 and cancels the pause in data transmission.

By the data transmission-stop unit 57 and cancel transmission-stop unit 60 stopping data transfer by the host device 1 during the period in the receive interrupt process from when the header of a print image command is received until whether or not DMA transfer is possible is determined in the command task, part of the data following the header being stored in the receive buffer 41 by the data storage unit 51 can be avoided. As a result, this embodiment of the disclosure prevents needing to transfer some of the data in the normal transfer mode.

In the receive interrupt process, the evaluation blocking unit 58 blocks the evaluation (decision) process of the interrupt evaluation unit 56. More specifically, if the received data is determined by the interrupt evaluation unit 56 to be the header of a print image command in the receive interrupt process, the evaluation blocking unit 58 prevents the interrupt evaluation unit 56 from evaluating the received data in the receive interrupt process from that point until data transfer of the print image command ends. More specifically, evaluation by the interrupt evaluation unit 56 in the receive interrupt process is omitted.

The print controller 59 controls the printer engine 12 to print images on the print medium based on the image data stored in the print buffer 42. More specifically, the print controller 59 reads the image data transferred to the print buffer 42 from the print buffer 42, and executes a printing process based on the read data. Note that a print unit is embodied by the print controller 59 and printer engine 12.

The receive interrupt process and command task of the printer controller 13 are described next with reference to FIG. 3 and FIG. 4.

Figure 3:
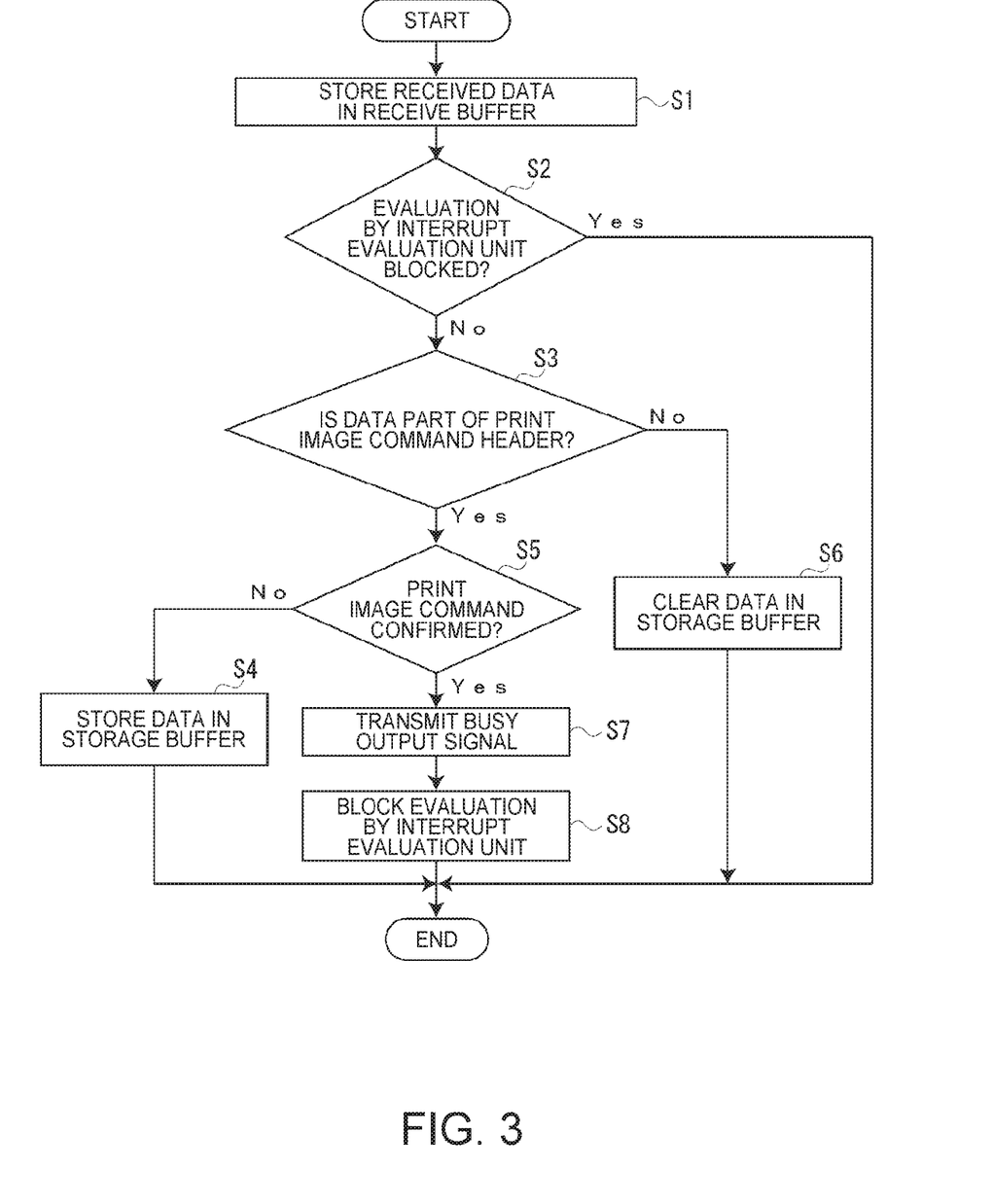
FIG. 3 is a flow chart of the interrupt reception process.

The receive interrupt process is described first with reference to FIG. 3. The receive interrupt process is a process of the USB interface 11 receiving data from the host device 1 and storing the received data to the FIFO buffer 23 when the data transfer mode is set to the normal transfer mode. Note that because data from the host device 1 is transmitted in 1-byte blocks as described above, the receive interrupt process executes every time one byte of data is received and stored to the FIFO buffer 23. Because the receive interrupt process is an interrupt process, if data is received from the host device 1 while a command task is executing, the command task is interrupted and the receive interrupt process executed.

As shown in FIG. 3, in the receive interrupt process, received data (data stored in the FIFO buffer 23) is first stored in the receive buffer 41 by the data storage unit 51 (S1, data storage step). More specifically, the received data is transferred from the FIFO buffer 23 to the receive buffer 41. Once the received data is stored in the receive buffer 41, whether or not the evaluation process of the interrupt evaluation unit 56 was blocked is determined (S2). If the evaluation process of the interrupt evaluation unit 56 was blocked (S2: YES), the receive interrupt process ends.

If evaluation by the interrupt evaluation unit 56 was not blocked (S2: NO), the interrupt evaluation unit 56 determines if the received data is the header of a print image command (interrupt evaluation step). More specifically, the interrupt evaluation unit 56 determines if one byte of the received data is data that is part of the header of a print image command (S3). If the received data is data that is part of the header of a print image command (S3: YES), a set of received data (data stored in the storage buffer and the data just received) is evaluated to be part of a print image command by plural iterations of the receive interrupt process (S5). If the set of received data is determined to be part of the header of a print image command (S5: YES), and the (set of) received data is determined to be the header of a print image command, control goes to the next step. If the set of received data is not determined to be part of the header of the print image command (S5: NO), the interrupt evaluation unit 56 stores the data in a storage buffer (S4) and ends the receive interrupt process.

If the received data is determined to not be part of the header of a print image command (S3: NO), the data in the storage buffer is deleted (cleared) (S6) and the receive interrupt process ends.

If the received data is determined to be the header of a print image command, the data transmission-stop unit 57 sends a BUSY output signal to the host device 1 (S7) and pauses data transmission by the host device 1 (stop transmission step). The evaluation blocking unit 58 then blocks evaluation by the interrupt evaluation unit 56 (S8). In other words, a mode in which the interrupt evaluation unit 56 is blocked from evaluating received data is entered. This ends the receive interrupt process.

A command task is described next referring next to FIG. 4. A command task is a process that is executed when the header portion of any command is extracted by the command interpreter 52 while examining data stored in the receive buffer 41.

Figure 4:
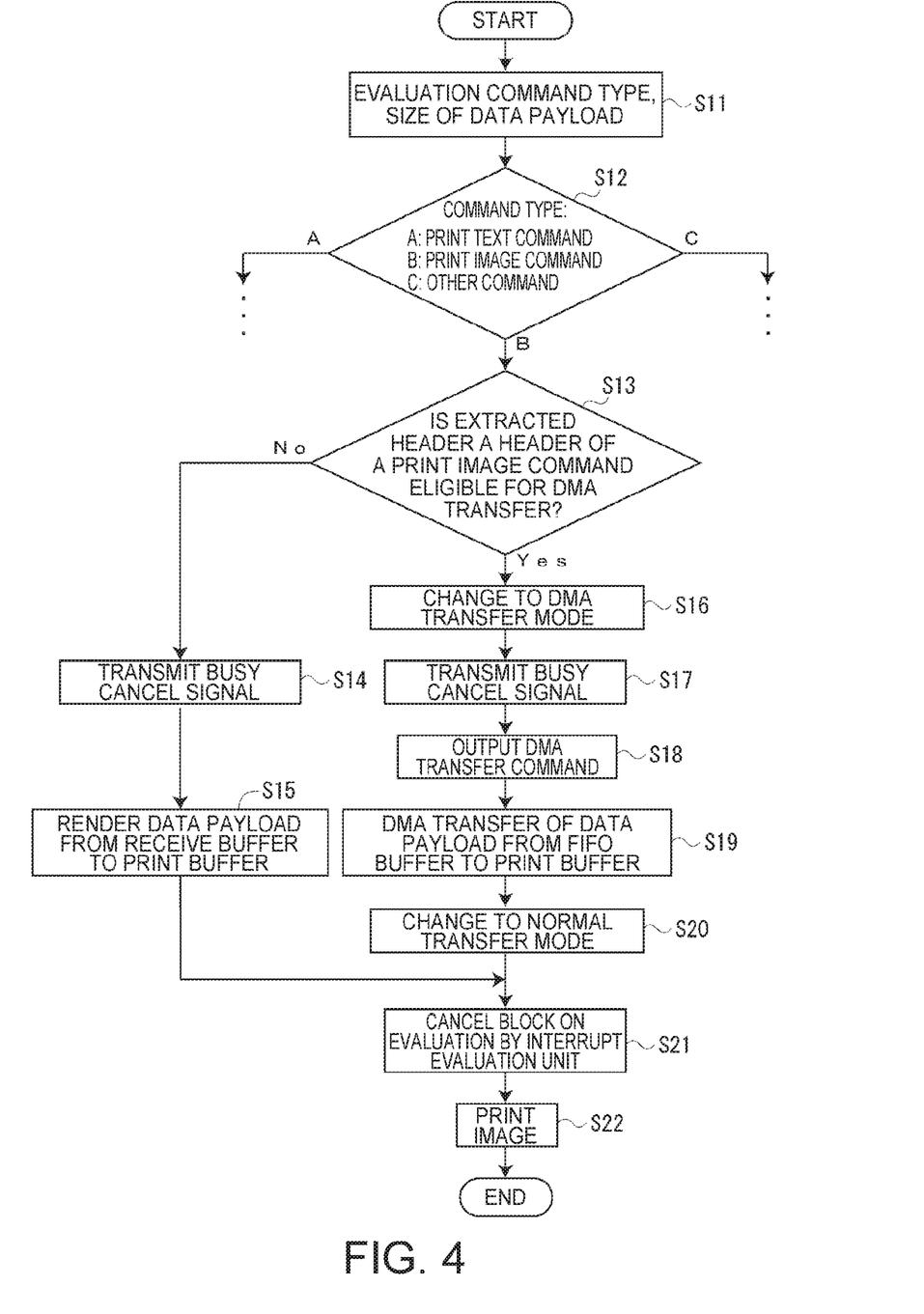
FIG. 4 is a flow chart of a command task.

As shown in FIG. 4, in the command task, the command interpreter 52 references the header portion of the extracted command, and determines the type of command and the size of the data payload of the command (S11). Once the type of command and the size of the data payload of the command are determined, a process appropriate to the command type is executed. Only the process executed when the type of command is determined to be a print image command (S12: B) is described below, and description of the processes executed when the command is determined to be a print text command (S12: A) or another type of command (S12: C) is omitted.

If the type of command is determined to be a print image command (S12: B), whether or not the extracted header is the header of a print image command eligible for DMA transfer is determined (S13) (evaluation step). More specifically, whether or not the print image command meets the conditions for DMA transfer is determined.

If the result of the decision is that the extracted header is the header of a print image command not eligible for DMA transfer (S13: NO), the mode selector 54 keeps the data transfer mode set to the normal transfer mode, the cancel transmission-stop unit 60 sends a BUSY cancel signal to the host device 1 (S14) and cancels the pause in data transfer by the host device 1 (cancel transmission-stop step). As a result, the data payload of the print image command following the extracted header is sent from the host device 1 to the printer 2. The data payload is then stored through the USB interface 11 to the receive buffer 41 by a receive interrupt process. Next, the command processor 53 renders the data stored in the receive buffer 41 in the print buffer 42 (S15). Note that this rendering process is done by transferring data from the receive buffer 41 to the print buffer 42 until the amount of data equal to the size acquired by the command interpreter 52 is transferred.

However, if the result of the decision is that the extracted header is the header of a print image command that is eligible for DMA transfer (S13: YES), the mode selector 54 changes the data transfer mode to the DMA transfer mode (S16, change mode step) and reports the same to the USB interface 11. The cancel transmission-stop unit 60 then sends a BUSY cancel signal to the host device 1 (S17) and cancels the pause in data transfer by the host device 1 (cancel transmission-stop step), and the command processor 53 outputs a DMA transfer command to the DMA transfer unit 55 (S18). As a result, the data payload of the print image command following the extracted header is sent from the host device 1 to the printer 2. The USB interface 11 receives and sequentially stores the data to the FIFO buffer 23. When the DMA transfer command is received, the DMA transfer unit 55 sends the data from the FIFO buffer 23 to the print buffer 42 (S19, DMA transfer step). In other words, the received data is not stored in the receive buffer 41, and instead is transferred directly to the print buffer 42. Note that this transfer process is done by transferring data from the FIFO buffer 23 to the print buffer 42 until the amount of data equal to the size acquired by the command interpreter 52 is transferred.

Once DMA transfer by the DMA transfer unit 55 ends, the mode selector 54 changes the data transfer mode from the DMA transfer mode to the normal transfer mode (S20), and reports the same to the USB interface 11.

Once data is transferred by either method to the print buffer 42, the evaluation blocking unit 58 cancels the block on evaluation by the interrupt evaluation unit 56 (S21). The print controller 59 then controls the printer engine 12 to print an image on the print medium (S22, printing step) based on the data (image data) stored in the print buffer 42. In other words, data stored in the print buffer 42 is read and printed. More accurately, images are printed by sequentially printing the data stored sequentially in the print buffer 42 during the data transfer process described above. The command task thus ends.

Thus comprised, as soon as received data is determined in the receive interrupt process to be the header of a print image command, data transfers by the host device 1 are paused and this data transfer pause is cancelled after evaluation by the command interpreter 52. As a result, data transmission by the host device 1 can be stopped during the time lag between transmission of the header of a print image command and determining whether the header is or is not the header of a print image command that is eligible for DMA transfer. As a result, data in the data payload following the header will not be stored to the receive buffer 41 during this time lag. Needing to transfer some of the data in the data payload of a print image command that can be transferred by DMA in a normal transfer mode can therefore be prevented. More specifically, the entire data payload of the print image command can be transferred in DMA transfer mode. High speed data transfer is therefore possible.

Furthermore, because this can be accomplished by printer-side control, high speed data transfer is possible without complicating the configuration of the host device and without needing to change the configuration (software) of the host device.

Because evaluation by the interrupt evaluation unit 56 is blocked until data transfer of the print image command is completed once the received data is determined to be the header of a print image command in the receive interrupt process, evaluation by the interrupt evaluation unit 56 can be omitted in the receive interrupt process while receiving the data payload of the print image command. This enables even faster data transfers of print image command data.

Note that this embodiment of the disclosure is configured to enter a DMA transfer mode and not execute the receive interrupt process when the received data is the header of a print image command that can be transferred by DMA. As a result, evaluation of the data payload by the interrupt evaluation unit 56 is omitted only when the received data is the header of a print image command that cannot be transferred by DMA.

The foregoing embodiment of the disclosure determines in a receive interrupt process whether or not received data is the header of a print image command, and temporarily stops data transmission by the host device 1 as soon as the header of a print image command is identified, but the disclosure is not so limited. For example, a configuration that determines in a receive interrupt process if the received data is the header of a print image command that can be transferred by DMA, and pauses data transmission by the host device 1 as soon as the received data is identified to be the header of a print image command that can be transferred by DMA, is also conceivable.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A printer comprising one or more processors configured to embody a plurality of functional units including:
a data storage unit configured to store data received from a host device in a receive buffer in a receive interrupt process;
an interrupt evaluation unit configured to determine if the data stored in the receive buffer in the receive interrupt process is a header of a print image command following evaluation of the data stored in the receive buffer by plural iterations of the receive interrupt process;
a data transmission-stop unit configured to cause the host device to pause data transmission if the header of a print image command is detected in the receive interrupt process;
a command interpreter configured to determine in a command task after the receive interrupt process if the data stored in the receive buffer is a header of a print image command that can be transferred by Direct Memory Access (DMA);
a mode selector configured to change the data transfer mode from a normal transfer mode to a DMA transfer mode if the command interpreter determines the data is a header of a print image command that can be transferred by DMA;
a cancel transmission-stop unit configured to cancels the pause of data transmission by the host device if the command interpreter determines the data is a header of a print image command that can be transferred by DMA;
a DMA transfer unit configured to transfer data received from the host device by DMA to a print buffer without storing the received data to the receive buffer when the mode selector has changed the data transfer mode from the normal transfer mode to a DMA transfer mode; and
a print unit configured to read the data transferred to the print buffer and print.

2. The printer described in claim 1, further comprising:
an evaluation blocking unit configured to block evaluation by the interrupt evaluation unit until data transfer of the print image command ends when the interrupt evaluation unit determines the received data is a header of a print image command.

3. The printer described in claim 1, wherein:
the mode selector holds the normal transfer mode as the data transfer mode when the command interpreter determines the data is not a header of a print image command that can be transferred by DMA; and
the cancel transmission-stop unit cancels the pause of data transmission by the host device when the command interpreter determines the data is not a header of a print image command that can be transferred by DMA.

4. The printer described in claim 1, wherein:
the interrupt evaluation unit stores the data in a storage buffer when the received data is determined to be data that is part of a header of a print image command and the received data is not yet confirmed to be a print image command, the received data comprising data stored in the storage buffer and a data just received,
the interrupt evaluation unit clears the storage buffer when the received data is determined to be data that is not part of a header of a print image command.

5. A control method of a printer, comprising:
a data storage step of storing data received from a host device in a receive buffer in a receive interrupt process;
an interrupt evaluation step of determining if the data stored in the receive buffer in the receive interrupt process is a header of a print image command following evaluation of the data stored in the receive buffer by plural iterations of the receive interrupt process;
a transmission-stop step of causing the host device to pause data transmission if the header of a print image command is detected in the receive interrupt process;

a command interpreting step of determining in a command task after the receive interrupt process if the data stored in the receive buffer is a header of a print image command that can be transferred by DMA;

a mode selecting step of changing the data transfer mode from a normal transfer mode to a DMA transfer mode if the command interpreting step determines the data is a header of a print image command that can be transferred by DMA (Direct Memory Access);

a cancel transmission-stop step of cancelling the pause of data transmission by the host device if the command interpreting step determines the data is a header of a print image command that can be transferred by DMA;

a DMA transfer step of transferring data received from the host device by DMA to a print buffer without storing the received data to the receive buffer when the mode selecting step has changed the data transfer mode from the normal transfer mode to a DMA transfer mode; and a print step of reading the data transferred to the print buffer and printing.

6. The control method of a printer described in claim 5, further comprising:

when the interrupt evaluation step determines the received data is a header of a print image command, blocking evaluation by the interrupt evaluation step until data transfer of the print image command ends.

7. The control method of a printer described in claim 5, wherein:

the mode selecting step holds the normal transfer mode as the data transfer mode when the command interpreting step determines the data is not a header of a print image command that can be transferred by DMA; and the cancel transmission-stop step cancels the pause of data transmission by the host device when the command interpreting step determines the data is not a header of a print image command that can be transferred by DMA.

8. The control method of a printer described in claim 5, wherein:

the interrupt evaluation step stores the data in a storage buffer when the received data is determined to be data that is part of a header of a print image command, and clears the storage buffer when the received data is determined to be data that is not part of a header of a print image command.

9. The printer described in claim 1, wherein:

the interrupt evaluation unit determines if the data stored in the receive buffer in the receive interrupt process is the header of the print image command in 1-byte units.

10. The control method of a printer described in claim 5, wherein:

the interrupt evaluation step of determining if the data stored in the receive buffer in the receive interrupt process is the header of the print image command is performed in 1-byte units.

* * * * *